United States Patent

Ichino et al.

[11] Patent Number: 5,862,426
[45] Date of Patent: *Jan. 19, 1999

[54] PROTECTION COVER DEVICE AND PROTECTION-COVER-EQUIPPED APPARATUS

[75] Inventors: Kazushige Ichino, Tokyo; Hiroshi Yoshii, Yokohama, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 787,822

[22] Filed: Jan. 23, 1997

[30] Foreign Application Priority Data

Jan. 30, 1996 [JP] Japan ................................ 8-013728

[51] Int. Cl.$^6$ ............................ G03B 17/02; G03B 11/04
[52] U.S. Cl. ............................................ 396/448; 359/511
[58] Field of Search ................................. 396/448, 348, 396/349; 359/511; 220/264, 336; 206/266; 215/235, 236, 244

[56] References Cited

U.S. PATENT DOCUMENTS

| 984,282 | 2/1911 | Main | 220/264 |
|---|---|---|---|
| 2,313,428 | 3/1943 | Glenn | 206/266 |
| 2,531,737 | 11/1950 | Lyon | 206/266 |
| 3,611,896 | 10/1971 | Aoki | 396/448 |
| 4,283,132 | 8/1981 | Engelsmann et al. | 396/448 |
| 4,396,270 | 8/1983 | Suzuki | 396/448 |
| 4,410,253 | 10/1983 | Tsuboi | 396/448 |
| 4,457,604 | 7/1984 | Tsuboi | 354/145.1 |
| 4,681,418 | 7/1987 | Kodaira | 396/448 |
| 5,461,441 | 10/1995 | Kotani | 396/448 |

FOREIGN PATENT DOCUMENTS 3220265  1/1983  Germany .

OTHER PUBLICATIONS

Patent Abstracts of Japan No. JP 58 033232 A, published Feb. 26, 1983.

*Primary Examiner*—Alan A. Mathews
*Attorney, Agent, or Firm*—Robin, Blecker & Daley

[57] ABSTRACT

A protection cover device and a protection-cover-equipped apparatus each comprise a protection cover, a moving member, and an elastic member which is incorporated into an inside of the protection cover and causes the protection cover to move in association with a movement of the moving member.

30 Claims, 9 Drawing Sheets

FIG. 1(a)

OPEN

CLOSED

FORCIBLE OPENING

CLOSED

FIG.9(a)

FORCIBLE CLOSING

OPEN

FIG. 12

CLOSED

FIG. 13

FORCIBLE OPENING

PROTECTION COVER DEVICE AND PROTECTION-COVER-EQUIPPED APPARATUS

BACKGROUND OF THE INVENTION

1. Field of the Invention

This invention relates to a protection cover device and a protection-cover-equipped apparatus, each of which opens and closes a front of a photo-taking optical system or the like.

2. Description of Related Art

Some of cameras have a barrier disposed on a front of a lens barrel and arranged as a protection cover to be openable and closable and to protect a lens from being soiled and damaged while the camera is not used for photographing.

Figure 11:
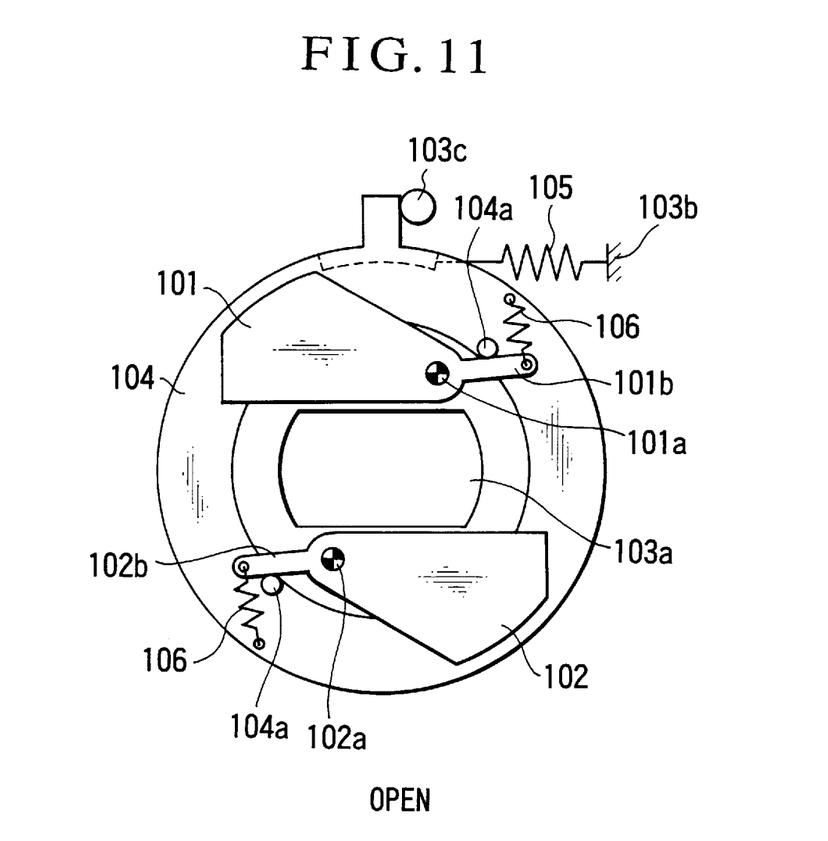
FIG. 11 is a front view showing the opening action of a conventional barrier mechanism.
Figure 12:
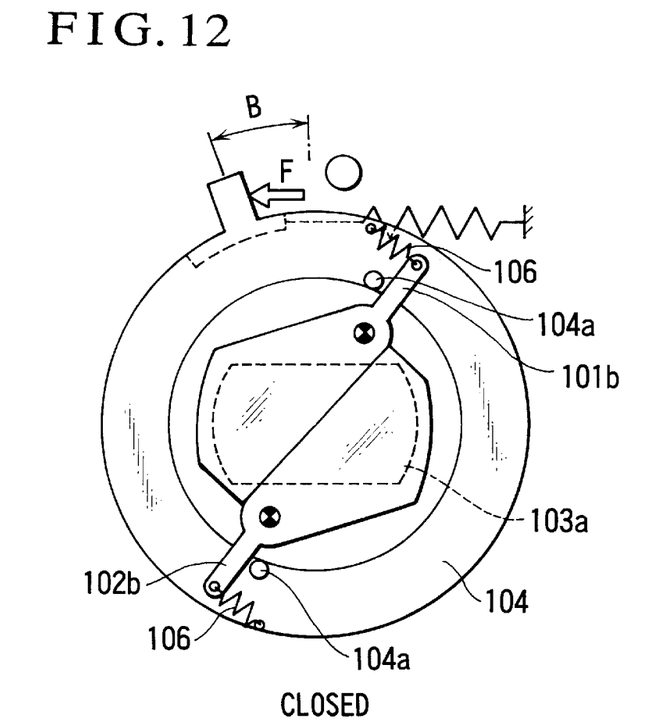
FIG. 12 is a front view showing the closing action of the conventional barrier mechanism.
Figure 13:
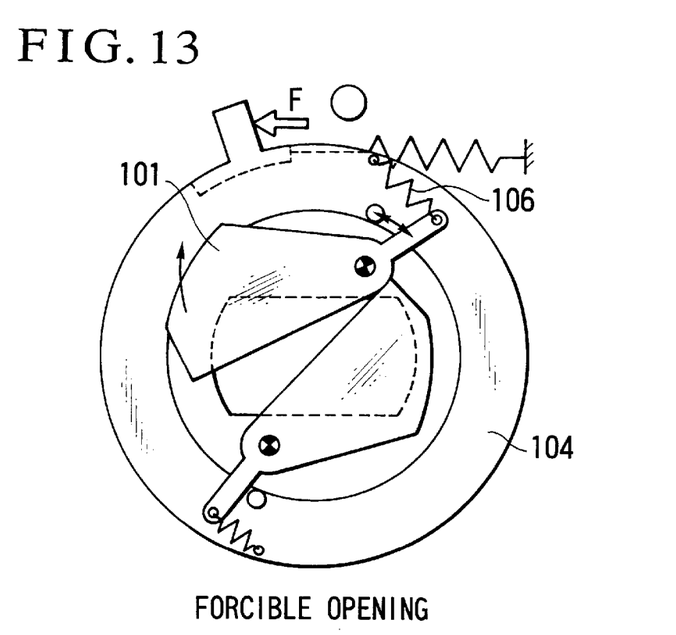
FIG. 13 is a front view showing a forcible opening action of the conventional barrier mechanism.

The conventional barrier (protection cover) opening-and-closing mechanism is arranged as shown in FIGS. 11, 12 and 13. Referring to these figures, two barriers 101 and 102 are rotatably secured to a base plate (not shown) in such a way as to be rotatable respectively on centers of rotation 101a and 102a. The base plate is disposed on a front of the lens barrel. A light-passing hole 103a is provided in the base plate for forming an optical path. An opening-and-closing ring 104 is mounted on the base plate in such a way as to be rotatable around an optical axis. A driving spring (tension spring) 105 is hooked on a spring peg part 103b of the base plate and is arranged to urge the opening-and-closing ring 104 to rotate clockwise as viewed in FIG. 11.

A rotation stopper 103c is arranged on the base plate to prevent a further clockwise rotation of the opening-and-closing ring 104 when the ring 104 is rotated to a position where the barriers 101 and 102 are opened by the opening-and-closing ring 104.

The barriers 101 and 102 are provided with arm parts 101b and 102b, respectively. Between the opening-and-closing ring 104 and each of the arm parts 101b and 102b, there is hooked an absorption spring (tension spring) 106, which is arranged to urge the barriers 101 and 102 to move in the direction of closing them.

Further, closing stoppers 104a are formed on the opening-and-closing ring 104. When the barriers 101 and 102 are opened, the arm parts 101b and 102b come to abut on the respective closing stoppers 104a, which then prevent the barriers 101 and 102 from closing.

The barrier mechanism configured in the above manner operates as follows. With no power applied to any parts of the barrier mechanism, the opening-and-closing ring 104 is in a state of being completely rotated clockwise by the urging force of the driving spring 105, and the barriers 101 and 102 are in an open state, as shown in FIG. 11.

When a power F (which may be a retracting force of the zoom lens barrel, a rotating force of a focusing motor, or the like) is received from the lens barrel as shown in FIG. 12, the opening-and-closing ring 104 rotates counterclockwise. Then, the closing stoppers 104a rotate also counterclockwise. In association with this rotation, the barriers 101 and 102 rotate in the closing direction to cover the light-passing hole 103a. For covering the light-passing hole 103a, the amount of rotation, i.e., an angle B, of the opening-and-closing ring 104 may be set at an amount sufficient to cause the barriers 101 and 102 to close the light-passing hole 103a by abutting on each other. However, with the degree of finishing precision of various parts, the play of their fitting engagement, etc., taken into consideration, the amount of rotation (the angle B) should be set at an ample amount including some amount of allowance.

The absorbing spring 106 then effectively acts to prevent the ample rotation from exerting any excessive force on the mechanism. In other words, when the amount of rotation of the opening-and-closing ring 104 is too much, the arm parts 101b and 102b of the barriers 101 and 102, which are in contact with the closing stoppers 104a of the opening-and-closing ring 104 in the open state, come a little apart from the closing stoppers 104a in the closed state.

Further, in a case where the barriers 101 and 102 happen to be prevented from rotating in the direction of closing by some impediment such as grains of sand or the like while they are in process of closing, as shown in FIG. 13, the absorbing spring 106 further elongates to permit the counterclockwise rotation of the opening-and-closing ring 104. The absorbing spring 106 thus permits an escaping movement of the opening-and-closing 104 for the barriers 101 and 102, so that the absorbing spring 106 effectively prevents a mechanical disorder from taking place under such a condition.

While a tension spring is used as the absorbing spring 106 in the above-stated case, the use of the tension spring is replaced with use of a torsion spring by hooking it at the center of rotation of the barriers in some case, for example, as disclosed in Japanese Laid-Open Patent Application No. HEI 7-159856.

However, in the case of the barrier mechanism of the type employing the tension spring as the absorbing spring, the absorbing spring cannot be disposed within an action area including a barrier moving part in the direction of a photo-taking optical axis. The use of the tension spring thus imposes a limitation on the structural arrangement of the barrier mechanism to necessitate use of a wide space for it.

Further, since the tension spring requires a space for its coil diameter in the direction of the optical axis, this causes an increase in the direction of thickness of the barrier mechanism.

Meanwhile, the barrier mechanism of another type using a torsion spring as the absorbing spring requires a thickness space, as a coil part, for its number of turns on the reverse side of the barrier mechanism. The coil part also causes an increase in the direction of thickness of the barrier mechanism. Besides, in order to make the spring force of the torsion spring efficiently act on each of the barriers, its coil part must be disposed in the center of rotation of the barrier. These requirements impose limitations on the design and the structural arrangement of the barrier mechanism.

It is conceivable to reduce the necessary space by arranging the tension spring or the torsion spring to have a smaller coil diameter or a less number of turns. Such arrangement, however, tends to cause the spring to be used beyond the limit of elasticity within a normal range of action and thus hardly enables the spring to adequately fulfill its function.

BRIEF SUMMARY OF THE INVENTION

In accordance with one aspect of this invention, there is provided a protection cover device and a protection-cover-equipped apparatus, each of which comprises a protection cover, a moving member, and an elastic member which is incorporated into an inside of the protection cover and causes the protection cover to move in association with a movement of the moving member, so that the protection cover device and the protection-cover-equipped apparatus can be adequately configured in a compact size.

The above and other aspects and features of this invention will become apparent from the following detailed description of embodiments thereof taken in conjunction with the accompanying drawings.

DETAILED DESCRIPTION OF THE INVENTION

Preferred embodiments of this invention are described in detail below with reference to the drawings.

Figure 1A:
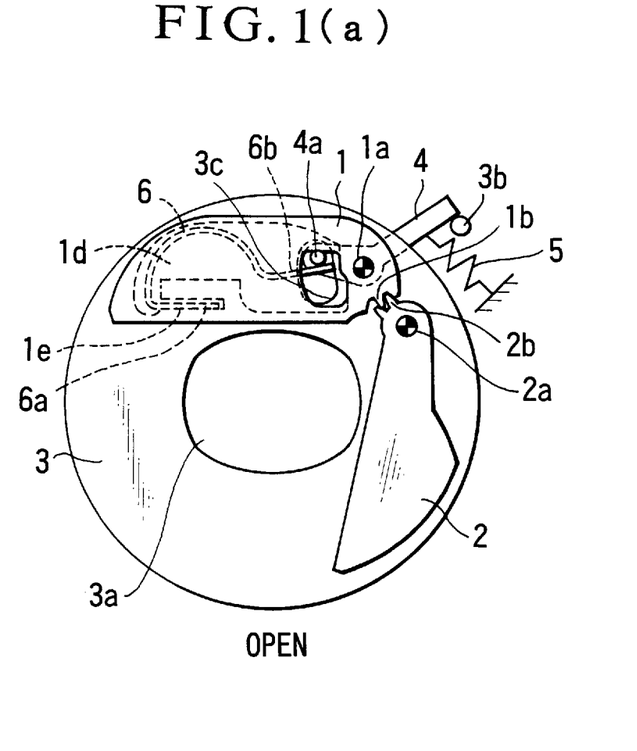
FIGS. 1(a) and 1(b) are a front view and an enlarged partial view, respectively, showing the opening action of a barrier mechanism according to a first embodiment of this invention.
Figure 1B:
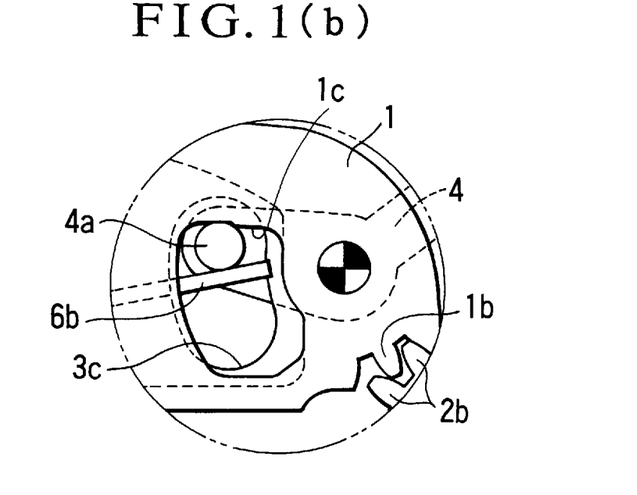
Figure 2A:
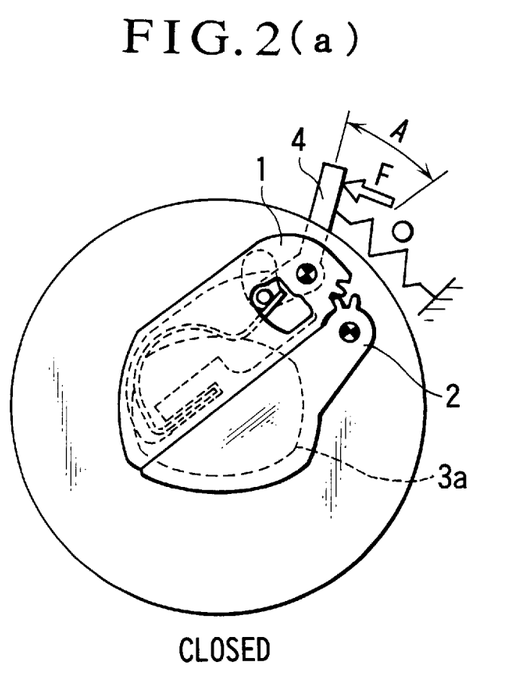
FIGS. 2(a) and 2(b) are a front view and an enlarged partial view, respectively, showing the closing action of the barrier mechanism according to the first embodiment.
Figure 2B:
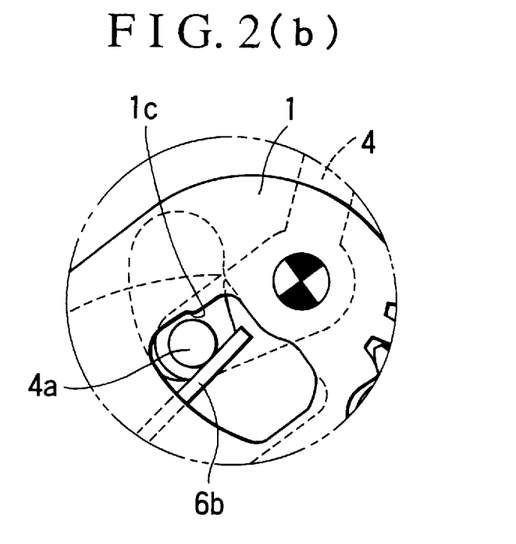
Figure 3A:
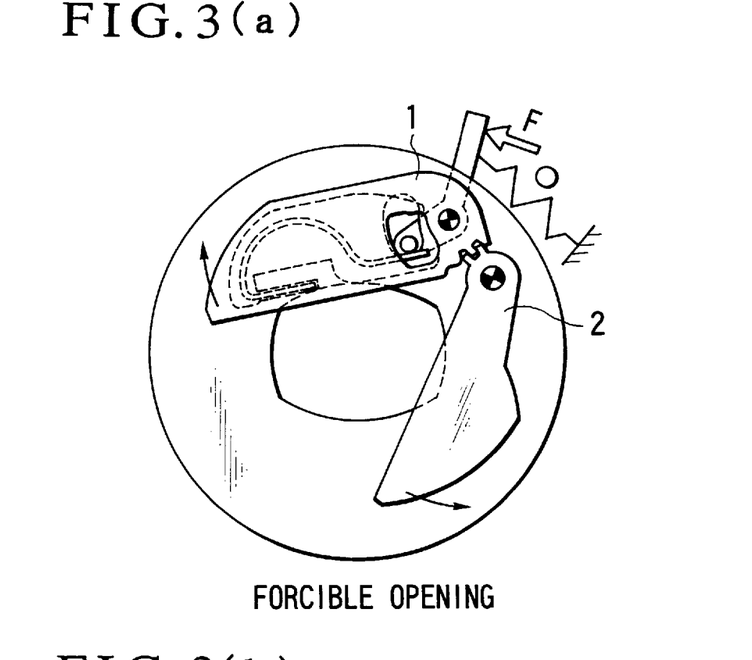
FIGS. 3(a) and 3(b) are a front view and an enlarged partial view, respectively, showing a forcible opening action of the barrier mechanism according to the first embodiment.
Figure 3B:
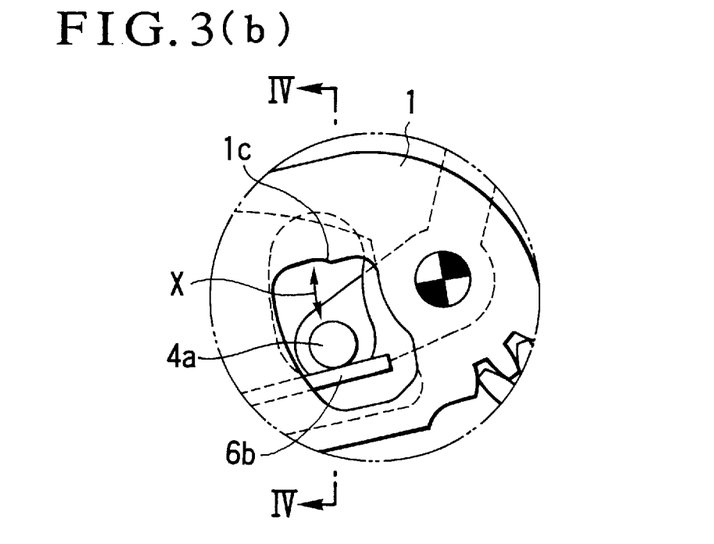
Figure 4:
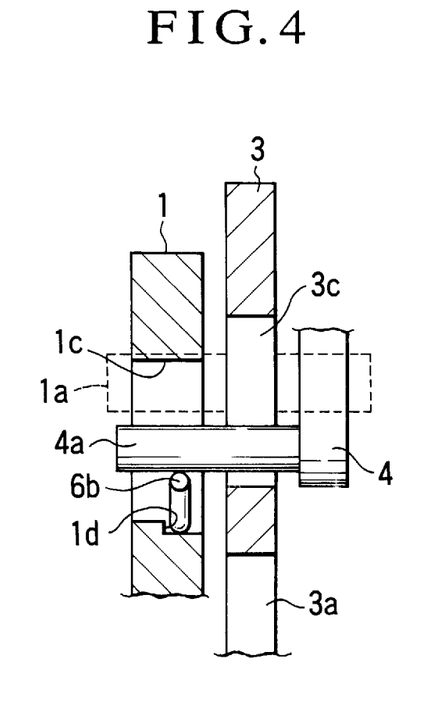
FIG. 4 is a sectional side view showing a main part of the barrier mechanism according to the first embodiment.

FIGS. 1(a) and 1(b) to FIG. 6 show a barrier mechanism of a camera according to a first embodiment of this invention. FIGS. 1(a), 2(a) and 3(a) are front views showing respectively opening, closing and forcible opening actions of the barrier mechanism. FIGS. 1(b), 2(b) and 3(b) are enlarged views respectively showing essential parts of FIGS. 1(a), 2(a) and 3(a). FIG. 4 is a sectional view taken on a line IV—IV shown in FIG. 3(b).

A main barrier 1 and a sub-barrier 2, which serve as a lens protection cover, are disposed on a front of a base plate 3. In the base plate 3, there is formed a light-passing hole 3a, adjacent to which a photo-taking optical system is disposed. The main barrier 1 and the sub-barrier 2 are mounted on the base plate 3 in such a way as to be rotatable respectively on centers of rotation 1a and 2a. The main barrier 1 and the sub-barrier 2 engage with each other at gear parts 1b and 2b. When the main barrier 1 is rotating, its rotating force is transmitted to the sub-barrier 2.

An opening-and-closing lever 4 which is rotatable on the almost same center of rotation as the main barrier 1 is mounted on the reverse side of the base plate 3. A driving spring (tension spring) 5 is arranged to urge the opening-and-closing lever 4 to move clockwise as viewed FIG. 1(a).

A stopper 3b is formed on the base plate 3 to prevent the opening-and-closing lever 4 from rotating to an excessive extent beyond a predetermined position. The opening-and-closing lever 4 is provided with a driving shaft 4a, which extends toward the front. The driving shaft 4a extends through a slot 3c formed in the base plate 3 and is fitted into an absorbing slot 1c formed in the main barrier 1.

Figure 5:
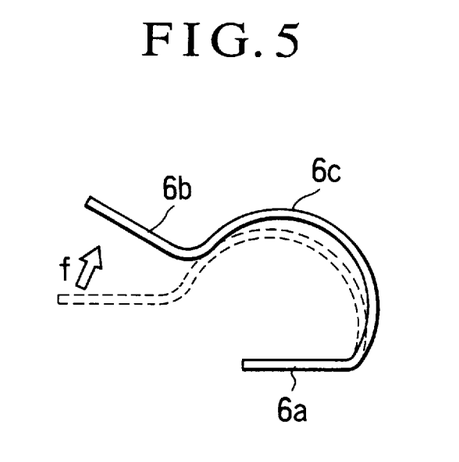
FIG. 5 is a front view of an absorbing spring used for the barrier mechanism according to the first embodiment.
Figure 6:
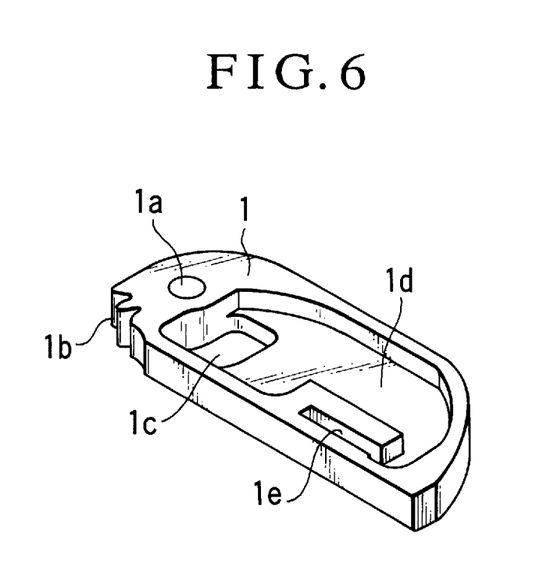
FIG. 6 is a rear perspective view of a main barrier used for the barrier mechanism according to the first embodiment.

As shown in FIG. 6, a counter-boring part 1d is formed on the reverse side of the main barrier 1. An absorbing spring 6, which is a linear-shaped spring as shown in FIG. 5, is accommodated in the counter-boring part 1d.

Referring to FIG. 5, the absorbing spring 6 is composed of a fixed part 6a which is inserted into and secured to a groove part 1e formed in the main barrier 1, a deforming part 6c which continues from the fixed part 6a and is arranged to be elastically deformed mainly within the counter-boring part 1d, and an acting part 6b which continues from the deforming part 6c. The absorbing spring 6 is arranged to be in a linear shape before deforming as indicated with a full line in FIG. 5, and is arranged to be deformed as indicated with a broken line so as to generate an urging force in the direction of an arrow f at the acting part 6b in a normal state of being attached to the main barrier 1 as shown in FIGS. 1(a) and 2(a).

The urging force f of the absorbing spring 6 acts to keep the driving shaft 4a of the opening-and-closing lever 4 abutting on one end face of the absorbing slot 1c of the main barrier 1, as shown in FIG. 1(b). The action of the absorbing spring 6 not only allows the main barrier 1 and the opening-and-closing lever 4 to rotate together but also causes the sub-barrier 2 to rotate.

In order to enable the absorbing spring 6 to sufficiently exert its elastic force without exceeding its limit of elasticity, the deforming part 6c must be arranged to have a sufficient length. Therefore, the area on the reverse side of the main barrier 1 where the counter-boring part 1d is formed is arranged to be as wide as possible. In addition to the use of the wide area, the length of the deforming part 6c is increased by forming it in a curved shape by curving it along the shape of the counter-boring part 1d. This arrangement enables the absorbing spring 6 to adequately fulfil its function although it is a torsion spring and has no coiled part.

It is an advantage of the absorbing spring 6 that, compared with a case where a tension spring or a torsion spring having a coiled part is employed as an absorbing spring, it permits the barrier mechanism to be arranged to have a less thickness.

Operation of the barrier mechanism which is configured as described above is next described as follows. Under such a condition that no power is applied to any part of the barrier mechanism, the opening-and-closing lever 4 is in a state of having been fully rotated clockwise by the urging force of the driving spring 5, and the main barrier 1 and the sub-barrier 2 are in an open state as shown in FIGS. 1(a) and 1(b).

Referring to FIGS. 2(a) and 2(b), when the opening-and-closing lever 4 is rotated counterclockwise by receiving a power F (which may be a retracting force of the zoom lens barrel, a rotating force of a focusing motor or the like) from the lens barrel, the driving shaft 4a rotates also counterclockwise. Then, the main barrier 1 rotates counterclockwise integrally with the driving shaft 4a, and the sub-barrier 2 rotates clockwise, thereby covering the light-passing hole 3a.

The amount of rotation of the opening-and-closing lever 4, i.e., an angle A, to be made in this instance may be set at an amount sufficient to cause the main barrier 1 and the sub-barrier 2 to close the light-passing hole 3a by abutting on each other. However, with the degree of finishing precision of various parts, the play of their fitting engagement, etc., taken into consideration, the amount of rotation (the angle A) should be set at an ample amount including some amount of allowance. The deforming part 6c of the absorbing spring 6 is then deformed to prevent the ample rotation of the opening-closing lever 4 from exerting any excessive force on the barrier mechanism. In other words, the end face part of the absorbing slot 1c and the driving shaft 4a, which are arranged to abut on each other when the barrier mechanism is in an open state, come to stay a little apart from each other when the barrier mechanism is in its closed state.

In a case where the main barrier 1 and the sub-barrier 2 happen to be prevented from rotating in the direction of closing by some impediment such as grains of sand or the like while they are in process of closing, as shown in FIGS. 3(a) and 3(b), the deforming part 6c of the absorbing spring 6 is further deformed to permit the counterclockwise rotation of the opening-and-closing ring 4. In other words, a gap X which is brought about by the closing action between the end face of the absorbing slot 1c and the driving shaft 4a increases. The absorbing spring 6 thus permits an escaping movement of the opening-and-closing lever 4 with respect to the main barrier 1 and the sub-barrier 2, so that the absorbing spring 6 effectively prevents a mechanical disorder from taking place under such a condition.

When the impediment is removed, the acting part 6b of the absorbing spring 6 pushes the driving shaft 4a toward the end face of the absorbing slot 1c. The main barrier 1 and the sub-barrier 2 are thus closed as shown in FIGS. 2(a) and 2(b).

FIG. 7 to FIGS. 9(a) and 9(b) show a barrier mechanism of a camera according to a second embodiment of this invention. The second embodiment differs from the first embodiment in that the urging direction of a driving spring 15 and that of an absorbing spring 16 of the second embodiment are arranged to be reverse to those of the corresponding springs of the first embodiment.

Figure 10:
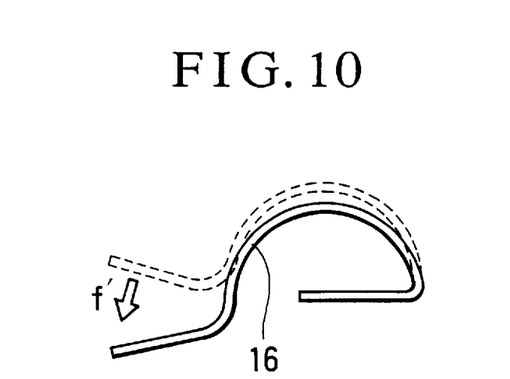
FIG. 10 is a front view of an absorbing spring used for the barrier mechanism according to the second embodiment.

Since the absorbing spring 16 is arranged to have its urging direction reverse to that of the absorbing spring 6 of the first embodiment, the absorbing spring 16 is in a shape as shown with a full line in FIG. 10 when it is not deformed. In the state of being in use, the absorbing spring 16 is in a shape as shown with a broken line in FIG. 10 and generates an urging force f'.

Figure 7:
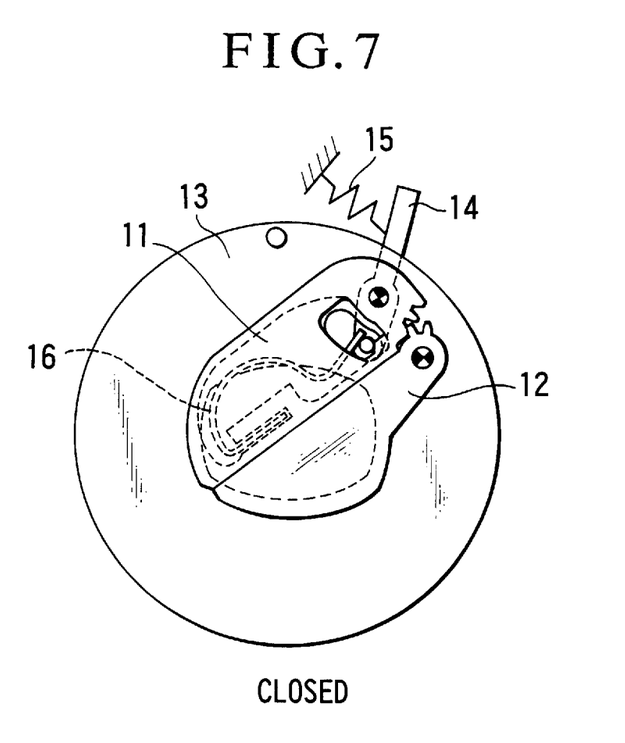
FIG. 7 is a front view showing the closing action of a barrier mechanism according to a second embodiment of this invention.

With no power applied to the barrier mechanism, a main barrier 11 and a sub-barrier 12 are kept in a closed state by the tensile force of the driving spring 15 as shown in FIG. 7. An opening-and-closing lever 14 is restrained from rotating by the closing of the barriers 11 and 12. Therefore, no inconvenience takes place without the action of the absorbing spring 16 under this condition.

Figure 8:
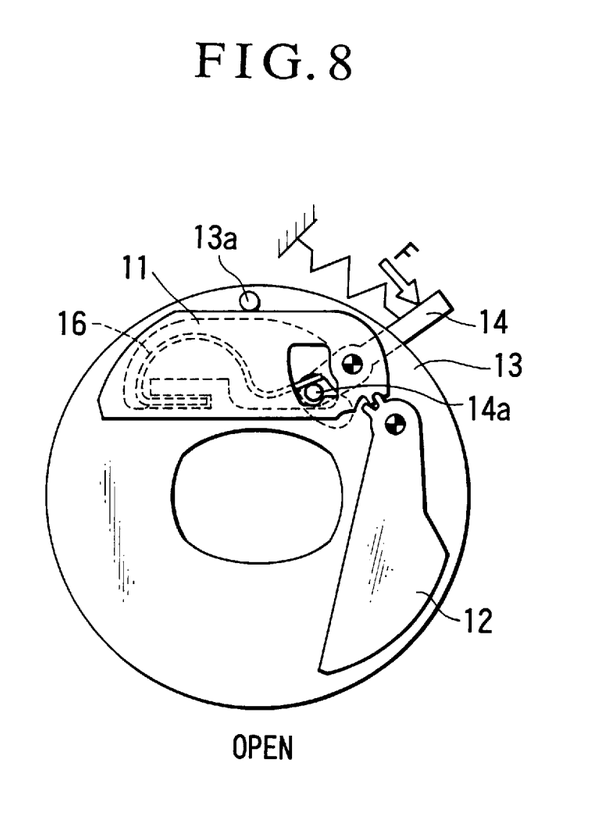
FIG. 8 is a front view showing the opening action of the barrier mechanism according to the second embodiment.

When the main barrier 11 and the sub-barrier 12 are opened by a force F as shown in FIG. 8, the opening motion of the main barrier 11 is restricted as the main barrier 11 comes to abut on an abutting part 13a formed on a base plate 13. The restriction imposed on the opening extent of the main barrier 11 by the abutting part 13a is arranged to permit the opening-and-closing lever 14 to rotate to a greater amount than the amount of rotation of the main barrier 11. Therefore, when the barrier mechanism is in an open state, a driving shaft 14a of the opening-and-closing lever 14 no longer abuts on an end face of an absorbing slot 11c provided in the main barrier 11. However, since the urging force of the absorbing spring 16 is acting in the direction of opening, the barriers 11 and 12 never come to close under that condition.

Figure 9A:
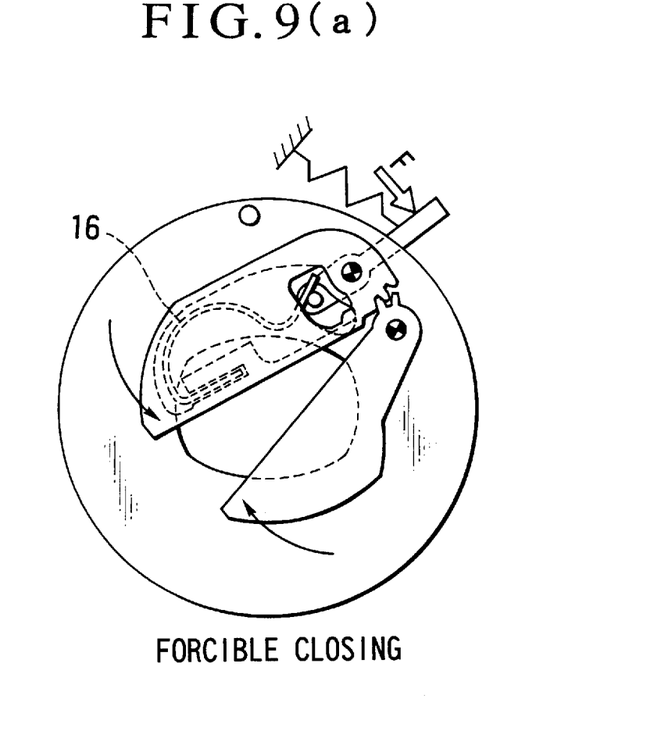
FIGS. 9(a) and 9(b) are a front view and an enlarged partial view, respectively, showing a forcible opening action of the barrier mechanism according to the second embodiment.
Figure 9B:
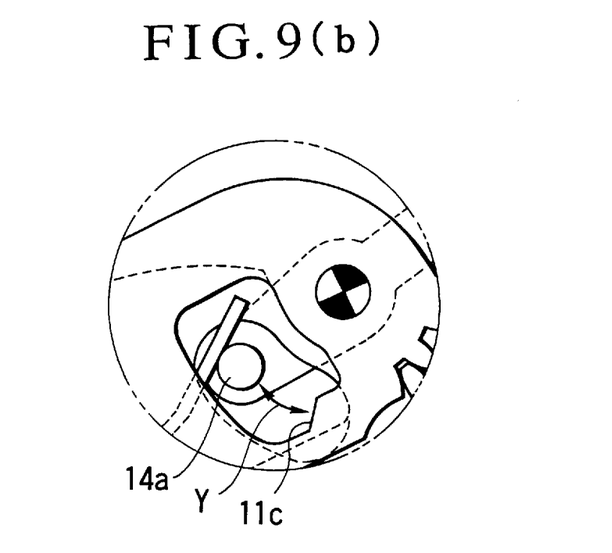

In a case where the main barrier 11 and the sub-barrier 12 happen to be prevented from rotating in the direction of opening by some impediment such as grains of sand or the like while they are in process of opening, as shown in FIGS. 9(a) and 9(b), the absorbing spring 16 is deformed more than in the state of FIG. 8 to increase a gap Y between the end face of the absorbing slot 11c and the driving shaft 14a. The absorbing spring 16 thus permits an escaping movement of the opening-and-closing lever 14 with respect to the main barrier 11 and the sub-barrier 12, so that any mechanical disorder can be prevented from taking place under such a condition.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, protection covers to which this invention is applicable are not only the type arranged to open and close a front of a photo-taking optical system in the manner described in the foregoing but also to protection covers arranged to have different structures and shapes or for different purposes.

This invention may be carried out by combining as necessary the embodiments or their technological elements described in the foregoing.

This invention applies to cases where either the whole or a part of claims or the arrangement of each embodiment described forms one apparatus or is used in combination with some other apparatus or as a component element of an apparatus.

Further, this invention is applicable to cameras of varied kinds, such as a single-lens reflex camera, a lens-shutter type camera, a video camera, etc., optical apparatuses other than cameras, devices adapted for cameras, optical apparatuses and other apparatuses, and component elements forming these apparatuses and devices.

As described in the foregoing, each of the embodiments is arranged to permit the barrier member to enter a closing action range in the direction of an optical axis by placing an elastic member in a counter-boring space or the like provided in the barrier member on its side opposed to the photo-taking lens. Compared with the conventional barrier device which restrains its elastic member from entering the closing action range of its barrier member, the arrangement of each of the embodiments not only allows a greater amount of design latitude but also permits reduction in size of the barrier device by obviating the necessity of having a space for the elastic member outside of the barrier member.

According to each of the embodiments described above, the elastic member can be arranged to have only a thickness which corresponds to the diameter of a linear material in the direction of the optical axis of the photo-taking lens by forming the elastic member with the linear material. This arrangement effectively permits a reduction in thickness of not only the elastic member but also that of the whole barrier device in the direction of the optical axis.

Further, according to each of the embodiments described above, the length of the elastic member can be increased to enable the elastic member to increase its limit of elasticity by arranging the elastic member to have a curved portion within a plane orthogonally intersecting the optical axis. That arrangement gives a large amount of elastic deformation tolerance sufficient for absorbing an escaping movement of the driving member which takes place with respect to the barrier member.

We claim:

1. A protection cover device comprising:
   a) a protection cover having opposed sides and an interior recess accessible from one of said opposed sides;
   b) a moving member; and
   c) an elastic member which causes said protection cover to rotate in association with a movement of said moving member, said elastic member being contained in said interior recess of said protection cover.

2. A device according to claim 1, wherein said protection cover is disposed to open and close a front of a photo-taking optical system.

3. A device according to claim 2, wherein the side of said protection cover through which said interior recess is accessible is opposed to said photo-taking optical system.

4. A device according to claim 1, wherein said recess of said protection cover is configured to retain said elastic member in said protection cover.

5. A device according to claim 1, wherein said elastic member is formed with a linear material which extends along said protection cover.

6. A device according to claim 1, wherein said elastic member is formed with a linear material which is deformed along said protection cover.

7. A device according to claim 1, wherein said elastic member is arranged to urge said protection cover to move in a closing direction.

8. A device according to claim 1, wherein said elastic member is arranged to urge said protection cover to move in an opening direction.

9. A protection-cover-equipped apparatus comprising:
   a) a protection cover having opposed sides and an interior recess accessible from one of said opposed sides;
   b) a moving member; and
   c) an elastic member which causes said protection cover to rotate in association with a movement of said moving member, said elastic member being contained in said interior recess of said protection cover.

10. An apparatus according to claim 9, wherein said protection cover is disposed to open and close a front of a photo-taking optical system.

11. A device according to claim 10, wherein the side of said protection cover through which said interior recess is accessible is opposed to said photo-taking optical system.

12. A device according to claim 9, wherein said recess of said protection cover is configured to retain said elastic member in said protection cover.

13. An apparatus according to claim 9, wherein said elastic member is formed with a linear material which extends along said protection cover.

14. An apparatus according to claim 9, wherein said elastic member is formed with a linear material which is deformed along said protection cover.

15. An apparatus according to claim 9, wherein said elastic member is arranged to urge said protection cover to move in a closing direction.

16. An apparatus according to claim 9, wherein said elastic member is arranged to urge said protection cover to move in an opening direction.

17. An apparatus according to claim 9, wherein said protection-cover-equipped apparatus includes a camera.

18. An apparatus according to claim 9, wherein said protection-cover-equipped apparatus includes a lens barrel.

19. An apparatus according to claim 9, wherein said protection-cover-equipped apparatus includes an optical apparatus.

20. A protection cover device comprising:
    a) a protection cover having opposed sides and an interior recess accessible from one of said opposed sides;
    b) a moving member; and
    c) an elastic member having a spring portion which causes said protection cover to rotate in association with a movement of said moving member, said spring portion being contained in said interior recess of said protection cover.

21. A protection-cover-equipped apparatus comprising:
    a) a protection cover having opposed sides and an interior recess accessible from one of said opposed sides;
    b) a moving member; and
    c) an elastic member having a spring portion which causes said protection cover to rotate in association with a movement cf said moving member, said spring portion being contained in said interior recess of said protection cover.

22. A device according to claim 1, wherein said protection cover comprises first and second cover members and wherein said recess is located in one of said first and second cover members.

23. An apparatus according to claim 9, wherein said protection cover comprises first and second cover members and wherein said recess is located in one of said first and second cover members.

24. A device according to claim 20, wherein said protection cover comprises first and second cover members and wherein said recess is located in one of said first and second cover members.

25. An apparatus according to claim 21, wherein said protection cover comprises first and second cover members and wherein said recess is located in one of said first and second cover members.

26. A camera comprising:
    a) a protection cover having opposed sides and an interior recess accessible from one of said opposed sides and arranged to open and close a front face of a photo-taking optical system;
    b) a moving member; and
    c) an elastic member contained in said interior recess of said protection cover for causing the protection cover to operate in association with movement oL the moving member, wherein the protection cover closes the front face of the photo-taking optical system.

27. A camera according to claim 26, wherein said protection cover has a recessed part into which said elastic member is incorporated.

28. A camera according to claim 26, wherein said elastic member is formed with a linear material which extends along said protection cover.

29. A camera according to claim 26, wherein said elastic member is formed with a linear material which is deformed along said protection cover.

30. A camera according to claim 26, wherein said elastic member is arranged to urge said protection cover to move in an opening direction.

* * * * *

UNITED STATES PATENT AND TRADEMARK OFFICE
CERTIFICATE OF CORRECTION

PATENT NO. : 5,862,426
DATED : January 19, 1999
INVENTOR(S) : Kazushige Ichino, et al.

It is certified that error appears in the above-identified patent and that said Letters Patent is hereby corrected as shown below:

Column 8, line 23, delete "cf" and insert --of--.
Column 8, line 50, delete "oL" and insert --of--.

Signed and Sealed this

Thirty-first Day of August, 1999

Attest:

Q. TODD DICKINSON

*Attesting Officer*   *Acting Commissioner of Patents and Trademarks*